United States Patent [19]

Janiga

[11] 4,436,875

[45] Mar. 13, 1984

[54] CURABLE POLYMERIC COMPOSITIONS

[75] Inventor: Eugene R. Janiga, Gladwin, Mich.

[73] Assignee: The Dow Chemical Company, Midland, Mich.

[21] Appl. No.: 88,273

[22] Filed: Oct. 25, 1979

[51] Int. Cl.$^3$ .............................................. C08F 8/00
[52] U.S. Cl. .................................. 525/385; 525/384; 525/385; 525/328.5
[58] Field of Search .................. 525/385, 384, 329

[56] References Cited

U.S. PATENT DOCUMENTS

| | | | |
|---|---|---|---|
| 3,033,833 | 5/1962 | Le Fevre et al. | 260/79.3 |
| 3,247,288 | 4/1966 | Masters | 260/837 |
| 3,483,170 | 12/1969 | Meij et al. | 260/78.5 |
| 3,697,619 | 10/1972 | Nagata et al. | 260/836 |
| 3,711,449 | 1/1973 | Brendley | 260/79.3 |
| 3,847,846 | 11/1974 | Asada | 260/13 |
| 3,962,372 | 6/1976 | Arhart | 260/878 R |
| 4,008,293 | 2/1977 | Maska et al. | 260/856 |
| 4,098,950 | 7/1978 | Gallacher | 260/850 |

*Primary Examiner*—Joseph L. Schofer
*Assistant Examiner*—Bernard Lipman
*Attorney, Agent, or Firm*—P. D. Shepheard

[57] ABSTRACT

A curable composition of a catalytic reactive polymeric component bearing at least one pendant catalytic, anionic group such as —SO$_3$H and a plurality of pendant carboxyl containing coreactive groups such as —COOH and having dispersed therein a coreactive component of a monohydroxide or monoepoxide of a hydrocarbyl ether is relatively stable at room temperatures but cures upon the application of heat to form a strong, solvent-resistant film. For example, a solution of a copolymer of methyl acrylate and 2-sulfoethyl methacrylate and a t-butyl glycidyl ether coreactive component can be applied to a suitable substrate and heated to form a cured film.

11 Claims, No Drawings

CURABLE POLYMERIC COMPOSITIONS

BACKGROUND OF THE INVENTION

This invention relates to curable polymeric compositions and to the cured composition prepared therefrom.

Due to their desirable physical and chemical properties such as toughness and solvent resistance, cross-linked acrylic and acrylic ester polymers, e.g., poly(methyl methacrylate) and copolymers, e.g., poly(styrene/ethyl acrylate), are widely employed as coating materials, glass substitutes and molding compositions.

Heretofore, several methods have been proposed for curing (cross-linking) the acrylic and acrylic ester polymers using a cross-linking agent, i.e., a polyfunctional compound reactive with said polymers which upon reaction serves as a crosslinkage between polymer molecules. For example, in U.S. Pat. No. 2,954,358, a copolymer of acrylic or methacrylic acid and an alkyl ester of one of said acids is heated at from 93° to 205° C. in the presence of a polyepoxide such as ethylene glycol diglycidyl ether, and optionally, a free catalyst, for a period of 30 seconds to an hour to form a cured product. Alternatively, as disclosed in U.S. Pat. No. 3,247,288, a polymerized $\alpha,\beta$-ethylenically unsaturated carboxylic acid dissolved in a polyepoxide such as the diglycidyl ether of 2,2-bis(4-hydroxyphenol)propane will cure in the presence of a catalyst in one to four hours at a temperature from 125° to 200° C. to form a cured composition. In addition, other acrylate polymers have been cured in the presence of an acid or base catalyst with such agents as a dicarboxylic acid; an aminotriazine; a phenolic, polyamide or urea-formaldehyde resin; or diphenylol propane diglycidyl ether. See, for example, U.S. Pat. Nos. 2,604,464; 3,020,255 and 3,058,947.

Unfortunately, the described curable acrylate polymer compositions are often unstable, i.e., the compositions cure sufficiently when stored for several days at room temperature, as evidenced by viscosity increase and gelling, to render the composition unusable. Therefore, the polymer and cross-linking agent must normally be mixed shortly before cure. Moreover, to cure the composition in a short time period, e.g., less than about one hour, relatively high temperatures are desired. In addition, following cure, the catalyst residues can migrate to the film's surface causing discoloration and loss of adhesion.

Similar problems are often experienced with self cross-linkable acrylate polymers, i.e., those polymers which can be cross-linked in the absence of a cross-linking agent. See, for example, U.S. Pat. No. 3,697,619 which discloses a curable composition of a self cross-linkable copolymer of 50–95 parts by weight methyl methacrylate and 5–50 parts by weight of the addition reaction product of an $\alpha,\beta$-ethylenically unsaturated acid and an epoxy compound.

In order to reduce the migration of the catalytic, acidic group, U.S. Pat. Nos. 3,711,449 and 4,008,293 disclose using an "internal" acid catalyst (wherein the catalytic, acidic groups are pendant to the acrylate polymer) to cross-link the acrylate polymer with a curing agent such as an aminoplast resin. Unfortunately, such curable compositions do not generally exhibit increased stability.

In view of the deficiencies of conventional curable acrylate polymer compositions and the methods for curing said compositions, it would be highly desirable to provide a curable acrylate polymer composition which is relatively stable at ambient temperatures but which cures in short periods upon the application of heat to form a hard, solvent-resistant film, coating or the like.

SUMMARY OF THE INVENTION

Accordingly, one aspect of the present invention is a curable polymeric composition comprising a catalytic reactive polymeric component bearing at least one pendant catalytic, anionic group and a plurality of pendant carboxyl containing coreactive groups. Dispersed within said composition is a coreactive component which contains a number of latent coreactive groups sufficiently inert to the carboxyl containing coreactive groups such that the composition is stable at ambient temperatures. In the presence of an amount of catalytic, anionic groups and at an elevated temperature sufficient to cure the polymer, the latent groups of the coreactive component are converted to groups coreactive with the carboxyl containing group.

In another aspect, the present invention is a cured polymeric composition prepared from the curable composition.

Due to the presence of the latent coreactive groups on the coreactive component, the curable compositions of the present invention are sufficiently stable at ambient temperatures, i.e., temperatures from about 18° to about 25° C., such that they do not generally exhibit gelling or substantial viscosity increases for a period of at least about seven days. However, at elevated temperatures, the latent coreactive groups are converted to groups coreactive with the carboxyl containing coreactive group, thereby providing the polymeric composition with sufficient functionality for cure. Moreover, due to the presence of the catalytic, anionic group, upon conversion of the latent groups to coreactive groups; the polymer cures relatively quickly, e.g., 10 minutes at 150° C., to a hard, solvent-resistant, cross-linked film.

The cured polymeric compositions exhibit excellent stain resistance, good flexibility and good impact resistance and are relatively water resistant. Accordingly, they have utility as coating compositions for a wide variety of substrates such as printing inks, general industrial enamels, and anti-static coatings. Other of the cured compositions, i.e., those which are only lightly cross-linked, are water-swellable, water-insoluble compositions and as such are suitably employed as hydrogels.

DETAILED DESCRIPTION OF ILLUSTRATIVE EMBODIMENTS

The catalytic reactive polymeric component of the present invention is a polymer bearing at least one pendant catalytic, anionic group and a plurality of pendant carboxyl containing coreactive groups. In general, the catalytic reactive polymeric components of this invention will have an addition polymer backbone, i.e., the polymer is formed by the direct attachment or combination of monomer molecules with one another. As such, the polymeric backbone of the reactive polymeric components is generally polyethylenic.

The catalytic, anionic groups useful in the practice of this invention are those strong acidic groups which catalyze the curing reaction of the curable polymeric composition. Preferably, the strong acidic group has a pKa of less than about 3 wherein pKa is defined as the negative logarithm (base 10) of the acidity constant of the acidic group in water at 25° C. A representative example of such acidic groups is:

i.e., sulfo.

For the purposes of this invention, the coreactive groups are groups which are capable of reacting with each other in the presence of an acidic group as described herein. In this invention, the coreactive group pendant to the catalytic reactive polymeric component is a carboxyl containing group, i.e., a group having a carboxyl moiety, such as —(COOH); hydrocarbyloxy carbonyl —(COOR), wherein R is a hydrocarbyl such as alkyl, cycloalkyl, aryl, aralkyl or an inertly substituted hydrocarbyl; and halocarbonyl —(COX) wherein X is Cl or Br. By "inertly substituted hydrocarbyl" it is meant that the hydrocarbyl group bears one or more substituents such as Cl, Br, $NO_2$ or the like which are inert to the polymerization and curing reactions described herein. By the term "plurality of carboxyl containing groups" it is meant a plurality of one such group or at least one of two or more such groups. Preferred carboxyl containing groups are —COOH or —COOR wherein R is alkyl, with —COOH and —COOCH$_3$ being especially preferred.

In the preparation of the catalytic reactive polymeric component, so long as the necessary plurality of pendant carboxyl containing coreactive groups and at least one catalytic, anionic group are pendant thereto, the molecular weight of the catalytic reactive polymer is not critical. Advantageously, the number average molecular weight of the catalytic polymer as determined by gel permeation chromatography is between about 10,000 and about 500,000, preferably between about 25,000 and about 200,000.

The catalytic reactive polymeric component is advantageously prepared by copolymerizing, using addition polymerization techniques, a reactive monomer, i.e., an ethylenically unsaturated monomer bearing a carboxyl containing coreactive group, with a catalytic monomer, i.e., an ethylenically unsaturated monomer bearing a catalytic, anionic group.

Representative examples of suitable carboxyl containing coreactive monomers include $\alpha,\beta$-ethylenically unsaturated carboxylic acids such as acrylic and methacrylic acid; alkyl esters of such acids, e.g., ethyl acrylate and methyl acrylate; and chlorides of such acids such as acryloyl chloride. As the properties of the reactive polymeric component and the products prepared therefrom are dependent on the type of the coreactive monomer(s) employed, the coreactive monomer(s) most advantageously employed is selected on the basis of the desired polymeric properties. In general, the alkyl esters of $\alpha,\beta$-ethylenically unsaturated carboxylic acids and acrylic acid are preferred, with ethyl acrylate, methyl acrylate, propyl acrylate, butyl acrylate and acrylic acid being especially preferred.

Examples of catalytic monomers include the sulfo esters of $\alpha,\beta$-ethylenically unsaturated carboxylic acids such as disclosed in U.S. Pat. Nos. 3,033,833; 3,024,221 and 3,147,301; monovinylidene aromatic sulfonic acids, e.g., styrene sulfonic acid; N-sulfonic acid derivatives of $\alpha,\beta$-ethylenically unsaturated amides as disclosed in U.S. Pat. Nos. 3,506,707; 3,332,904 and 3,544,597. Representative examples of such catalytic monomers include 2-sulfoethyl methacrylate, 1-acrylamide-1-ethane sulfonic acid, 1-acrylamide-1-propane sulfonic acid, 1-methacrylamide-1-ethane sulfonic acid, styrene sulfonic acid and the like. Preferred are the sulfo esters of $\alpha,\beta$-ethylenically unsaturated carboxylic acids, with 2-sulfoethyl methacrylate being most preferred.

The type and proportion of the catalytic monomer are advantageously selected such that the polymeric composition contains the desired amount of catalytic, anionic groups. Such desired amount is an amount such that (1) at the curing conditions hereinafter specified, the latent groups, as hereinafter described, are converted to groups coreactive with the carboxyl containing coreactive group and (2) the cross-linking reaction of the polymeric component is catalyzed. In general, the catalytic reactive polymer advantageously comprises from about 0.5 to about 50, preferably from about 2 to about 40, mole percent of the catalytic reactive monomer based on the total moles of the coreactive monomer and the catalytic monomer and/or chain terminator.

In addition to the foregoing monomers, other copolymerizable ethylenically unsaturated monomers which do not bear catalytic or coreactive groups are often advantageously incorporated in the catalytic reactive polymer. Examples of such monomers include monovinylidene aromatics such as styrene, t-butyl styrene and $\alpha$-methyl styrene; unsaturated nitriles such as acrylonitrile; aliphatic haloolefins such as vinyl chloride and vinylidene chloride and aliphatic conjugated dienes such as 1,3-butadiene and 2,4-hexadiene. As such monomers affect the properties of the products prepared therefrom, the preferred monomers are advantageously selected on the basis of their polymeric properties. When such optional monomers are employed, they are advantageously employed in amounts such that they constitute less than about 90, more advantageously from about 10 to about 75, mole percent of the polymer.

The catalytic reactive polymer is readily prepared by subjecting an appropriate monomeric mixture to solution polymerization conditions in the presence of a free radical initiation means. The polymerization is carried out under an oxygen-free atmosphere in a water-free reaction diluent into which the monomeric mixture is continuously added during the early stages of the reaction period, usually over a period from about 0.2 to about 4 hours.

Reaction diluents suitably employed include relatively volatile liquids, preferably those in which both monomers and the resulting polymer are soluble, which liquids are non-reactive towards the reactants. Examples of such reaction diluents are the chlorinated organic solvents such as perchloroethylene and 1,1,1-trichloroethane; other organic liquids such as tetrahydrofuran, diethylene glycol methyl ether, toluene and the like. Of the foregoing, tetrahydrofuran and toluene are preferred.

Suitable free radical type initiators include UV light and conventional chemical initiators such as azo compounds and the peroxygens. Of particular interest are the peroxygens, especially t-butyl peroctoate and t-butyl perbenzoate. Typically, such initiators are employed in conventionally effective amounts. Generally, such amounts range from about 0.05 to about 4 weight percent, more often from about 1 to about 3 weight percent, said weight percents being based on the total weight of the monomers.

Essentially complete conversion of the reacted monomers to the desired polymer is accomplished in a period of from about 2 to about 8 hours, especially from about 2 to about 4 hours, at reaction temperatures within the range of from about 25° to about 125° C., especially from about 40° to about 80° C.

Coreactive components for the catalytic reactive polymeric component are compounds containing a plurality of groups which are coreactive with the carboxyl containing coreactive group pendant from said polymer in the presence of an amount of acidic groups and at elevated temperatures sufficient to cross-link the polymer. Advantageously, such groups coreactive with the carboxyl containing group are groups having an active atom (as determined by the Zerewitnoff method as described in the Journal of the American Chemical Society, Vol. 49, December 1969, E. P. Kohler, J. F. Stone, Jr. and R. C. Fuson, "An Apparatus for Determining Both the Quantity of Gas Evolved and the Amount of Reagent Consumed in Reactions With Methyl Magnesium Iodide", page 3181). Typically, such coreactive groups are hydroxy groups, particularly wherein the hydroxy group is bonded to a nitrogen unsubstituted carbon atom. By the term "nitrogen unsubstituted" it is meant that carbon atom to which the hydroxy group is bonded is not directly bonded to a nitrogen atom such as N-methylolamine $-(NCH_2OH)$. Primary and secondary hydroxy groups are preferred. Also included within the term "coreactive hydroxy groups" are those groups which, in the presence of an acidic group as defined herein and at ambient temperatures, i.e., a temperature from about 18° to about 25° C., are converted to a coreactive hydroxy group. Representative of such group is an epoxy group.

All or all but one of the coreactive groups of the coreactive component is a latent coreactive group, thereby making the resulting curable composition stable at ambient temperatures. As used herein, the term "latent coreactive group" refers to a group which is normally essentially inert to a carboxyl containing group at ambient temperatures, and which, in the presence of catalytic, anionic groups and at elevated temperatures becomes a group coreactive with the carboxyl containing coreactive group. As the term is used herein, "elevated temperatures" refers to temperatures above about 30° C. which temperatures are sufficient to convert the latent coreactive groups to groups coreactive with the carboxyl containing coreactive group, thereby providing the polymeric composition of this invention with sufficient functionality to cure. By the term "essentially inert" it is meant that the latent coreactive group and carboxyl containing coreactive group are sufficiently inert towards one another such that, when each group is employed in accordance with the practice of this invention, the composition is stable. By "stable" it is meant that the mixture of the polymeric component and the coreactive component does not exhibit gelling, i.e., the mixture does not form a non-flowing solid mass, within a period of about 72 hours at ambient temperatures, after forming said mixture. Advantageously, the mixture maintains a relatively constant viscosity, i.e., the viscosity does not increase by more than about 250 percent when measured on a Brookfield LVT type viscometer, (Spindle, No. 2 at 30 rpm) after being stored for two weeks at ambient temperatures. Preferably, at these conditions the viscosity is less than about 200, more preferably less than about 150, percent of the original viscosity.

Representative of such a latent group is hydrocarbyloxy, i.e., $-(OR)$, wherein R is an acidic activated leaving group. For the purposes of this invention, an "acidic activated leaving group" is a group which, in the presence of an acidic group (as defined herein) and at elevated temperatures sufficient to cure the composition of the present invention, is capable of being displaced by a proton (H+) or capable of furnishing an electron pair to form a covalent bond. Preferred acidic activated leaving groups are alkyl groups wherein the carbon atom bonded directly to the oxygen atom of the $-OR$ group is a tertiary carbon atom such as a tert-butyl group, i.e.,

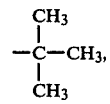

or a secondary carbon atom such as sec-butyl, i.e.,

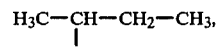

or isopropyl, i.e.,

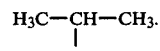

Most preferred of said acidic activated leaving groups is tert-butyl.

Typically, the coreactive component bears one latent coreactive group and one group, which in the presence of an acid catalyst and at ambient temperatures, is coreactive with the pendant carboxyl containing coreactive group of the catalytic reactive monomer. Representative of such coreactive components include the monohydroxides of a hydrocarbyl ether represented by the formula:

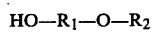

and the monoepoxides of a hydrocarbyl ether represented by the formula:

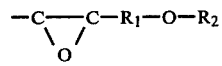

wherein $R_1$ is a divalent hydrocarbon radical such as ethylene or propylene and $R_2$ is an acidic activated leaving group as defined herein. Representative examples of such compounds are t-butyl glycidyl ether, ethylene glycol mono-t-butyl ether, ethylene glycol mono-iso-butyl ether, and the like. Alternatively, the coreactive component can bear two or more latent coreactive groups. Representative of such coreactive component is diethylene glycol di-t-butyl ether. Of such coreactive components, t-butyl glycidyl ether is especially preferred.

The reactive polymeric component and the coreactive component are mixed at proportions sufficient to form a curable polymeric composition. The proportion of each component most advantageously employed is dependent on a variety of factors, including the type and amount of monomers employed in preparing the reactive polymer or catalytic reactive polymer, the coreactive component employed and the desired properties of the cured polymer. In general, the curable polymeric composition advantageously comprises from about 65 to about 99, preferably from about 75 to about 95, weight percent of the reactive polymer and from about 35 to about 1, preferably from about 25 to about 5, weight percent of the coreactive component, said weight percent being based on the total weight of the reactive polymer and coreactive component. The curable composition most preferably consists of stoichiometric amounts of each of the coreactive groups with respect to one another.

Optionally, a component bearing two or more hydroxy groups coreactive with the carboxyl containing groups of the catalytic, reactive polymer is incorporated within the curable compositions of this invention. In general, such hydroxy bearing component enhances the physical properties of the films prepared from the curable compositions. The hydroxy bearing components useful herein can be addition polymers prepared from an ethylenically unsaturated monomer bearing a hydroxy group using the addition polymerization techniques hereinbefore described. Examples of such hydroxy bearing monomers include the $\alpha,\beta$-ethylenically unsaturated alcohols such as 2-propen-1-ol, the hydroxy containing monovinylidene aromatics such as 2-propenylphenol and the hydroxyalkyl esters of acrylic or methacrylic acid such as hydroxypropyl acrylate, hydroxypropyl methacrylate or hydroxyethyl acrylate. Such monomers are advantageously incorporated within the curable composition by copolymerizing said monomers with the carboxyl containing coreactive monomer and the catalytic monomer in the preparation of the catalytic reactive polymer. Preferred of such hydroxy bearing monomers are the hydroxyalkyl esters of acrylic or methacrylic acid; with the hydroxyalkyl esters of acrylic acid (which monomers, for the purposes of this invention, bear both a hydroxy and carboxyl containing group), particularly hydroxyethyl acrylate, being most preferred.

More advantageously, hydroxy groups are introduced into the curable composition by means of a polyhydric alcohol such as a glycol, e.g., ethylene glycol and diethylene glycol; glycerol; polyglycerol, e.g., diglycerol; hexaglycerol and decaglycerol; sorbitol; tetrahydroxybutane; pentaerythritol and the like. Preferred of such polyhydric alcohols are the glycols, glycerol and pentaerythritol.

Although, in general, the incorporation of the optional hydroxy bearing component into the curable composition destroys the stability of the composition (the pendant hydroxy and carboxyl containing groups react, thereby gelling the composition); said stability is retained when the coreactive component is a monoepoxide of a hydrocarbyl ether. It is believed that this stability retention is due to the neutralization of the catalytic, anionic groups by the monoepoxide of the hydrocarbyl ether which thereby substantially reduces the rate of reaction between the hydroxy and carboxyl containing groups. When heated, the neutralized catalytic, anionic group regains its acidic characteristic, thereby catalyzing the curing reactions.

As the properties of the cured films prepared from the curable composition of this embodiment are dependent on the amount and type of the hydroxy bearing component employed therein, the amount of the said hydroxy bearing component is advantageously selected on the basis of the cured properties desired. Generally, when employed, said hydroxy bearing component advantageously comprises from about 0.5 to about 10, preferably from about 1 to about 5, weight percent, said weight percents being based on the total weight of the coreactive component, catalytic reactive component and the hydroxy containing component.

Advantageously, the curable compositions of this invention are prepared as a solution of the reactive polymer, coreactive component and, optionally, the hydroxy containing component in a relatively volatile, normally liquid, solvent. Typically, the solvent is advantageously the reaction diluent in which the reactive polymer is prepared, with toluene and tetrahydrofuran being preferred.

Advantageously, the curable composition is prepared by adding the coreactive component to a solution of the catalytic reactive polymeric component. Although said addition can be conducted batchwise, i.e., the entire amount of the coreactive component is added to the polymeric solution; often, the coreactive component is advantageously added continuously to said solution. To prevent premature cure, said continuous addition is particularly advantageous when, upon said addition, the resulting mixture exotherms, e.g., when the coreactive component bears an oxiranyl group which exothermically reacts to form a hydroxy group in the presence of acidic groups. In such case, the coreactive component is advantageously added as a dilute solution in an organic solvent miscible with the solvent in which the polymer is dissolved.

The viscosity at which the solutions are advantageously prepared will vary with the end use application thereof. Typically, said viscosities will vary with many factors, including the specific solvent, and the type and concentration of reactants. For many applications, the solutions are advantageously prepared such that a uniform film can be prepared therefrom. As an example thereof, a reactive polymeric composition of 50 weight percent of a catalytic reactive copolymer of 50 weight percent of methyl acrylate and 50 weight percent of 2-sulfoethyl methacrylate; 8 weight percent of a coreactive component of t-butyl glycidyl ether; and 42 weight percent of tetrahydrofuran has a sufficiently low viscosity such that, in spray coating applications, a coating of substantial thickness, e.g., from about 0.0025 to about 0.025 mm, is deposited in a single spraying.

The curable compositions of this invention are cured in the presence of an amount of catalytic, anionic groups, as herein described and at conditions sufficient to cross-link the polymer(s). By "cure" it is meant that the polymer is cross-linked to a degree sufficient to render them normally solid and/or water insoluble, i.e., do not form a true solution in the organic solvent.

Curing conditions advantageously employed in the practice of this invention are dependent upon various factors including the specific reactive polymer, coreactive component and catalytic component employed, their concentrations and the specific coreactive groups. Typically, an elevated temperature between about 100° and about 175° C., preferably between about 125° and 150° C., for periods from about 1 to about 30, preferably from about 5 to about 15, minutes are advantageously employed to cure the polymers.

The following examples are presented to illustrate the present invention. All parts and percentages are by weight unless otherwise indicated.

EXAMPLE 1

To a suitable size flask equipped with a reflux condenser, thermocouple, stirrer, thermometer, monomer reservoir, metering pump and heating and cooling means is added 50 parts of tetrahydrofuran, 3 parts of 2-sulfoethylmethacrylate, 7 parts of methyl acrylate and 0.2 part of azobisisobutyronitrile. The flask is purged with nitrogen and heated to 60° C. with agitation. A feed of the following ingredients:

| Ingredient | Parts |
| --- | --- |
| Tetrahydrofuran | 50 |
| Methyl acrylate | 63 |
| 2-Sulfoethyl methacrylate | 27 |
| Azobisisobutyronitrile | 0.5 | is added dropwise to the flask over a period of 3 hours. After completion of the feed, the flask is maintained at 60° C. for 1 hour, followed by 65° C. for an additional 1½ hours. It is then cooled to 23° C. The final solution (50 percent solids) is a hazy solution containing a catalytic reactive polymer of methyl acrylate and 2-sulfoethyl methacrylate.

To a 45-part portion of the composition is added 4.5 parts of a coreactive component of t-butyl glycidyl ether. During the addition of the t-butyl glycidyl ether, the composition exotherms and heat is evolved. The resulting mixture is a clear viscous solution and is designated Sample No. 1. It is an example of a curable polymeric composition prepared in accordance with the method of this invention.

A second 45-part portion of the composition remains neat, i.e., no coreactive component is added thereto. This resulting solution is designated Sample No. 2 and is not an example of this invention.

Portions of each polymer solution are applied to glass plates at a wet thickness of 0.025 mm and baked for 10 minutes at 150° C. The cured films are then tested for water and solvent resistance and Sward hardness. The remaining portion of each polymer solution is tested for stability. The results of this testing are recorded in Table I.

TABLE I

| Polymeric Composition (1) | Sample No. 1 | Sample No. 2* |
| --- | --- | --- |
| Polymer | | |
| Type | SEM/MeA | SEM/MeA |
| Monomer Content, Wt. % | — | — |
| Coreactive Component | t-BGE | None |
| Water Resistance, hrs (2) | 0.05 | Soluble |
| Solvent Resistance (3) | Good | Poor |
| Sward Hardness (4) | 50 | 3 |
| Stability, hrs (5) | >600 | 0.2 |

*Not an example of this invention.
(1) MeA = methyl acrylate, SEM = 2-sulfoethyl methacrylate, t-BGE = t-butyl glycidyl ether
(2) Water resistance is tested by contacting the coated surface of the glass panel with 2 ml of water and then covering the surface with a watch glass. The cured film on the glass panel is observed for signs of wrinkling or weakening. Water resistance is reported as the time in hours before initial wrinkling or weakening is observed. The term "soluble" indicates the film is soluble in the water.
(3) A cloth, soaked with methyl ethyl ketone, is rubbed with slight pressure on the coated surface of the glass panel. The rubber surface is checked for mar. A rating of good indicates no change in film appearance after 100 double rubs with the cloth. A rating of poor indicates marring and film softening at less than 50 double rubs.
(4) Determined with a Sward Rocker wherein the Sward hardness value is the hardness as compared to glass with glass hardness being taken as 100.
(5) Stability is the time required for gelation to occur as determined by placing equal portions of each polymer solution into separate airtight containers and storing the containers at 23° C. Gelation is that time when the polymer solution is no longer a normally free flowing liquid. The stability of Sample No. 2 is the time required for gelation after adding a polyhydric alcohol to the sample.

As evidenced by the data in the foregoing Table, the curable polymeric compositions of this invention are relatively stable compositions which, upon cure, form hard, water- and solvent-resistant films.

EXAMPLE 2

Using the polymerization techniques described in Example 1, a copolymer solution composed of 100 parts of tetrahydrofuran having dissolved therein 100 parts of a copolymer derived from equal parts of sulfoethyl methacrylate and methyl acrylate is prepared. To the resulting 200-part sample of the copolymer solution is added 50 parts of t-butyl glycidyl ether. Upon this addition, the solution exotherms and becomes warm to the touch. The resulting solution is a curable composition prepared in accordance with the present invention and does not exhibit any evidence of gelling after a one-week period.

After aging the curable composition for this one-week period, 200 parts of a copolymer solution composed of 100 parts tetrahydrofuran and 100 parts of a copolymer derived from equal parts of hydroxyethyl acrylate and methyl acrylate is added thereto. The resulting composition is composed of a catalytic reactive polymer bearing pendant carboxyl containing coreactive groups and sulfo catalytic, anionic groups; a coreactive component of t-butyl glycidyl ether; and a polymeric component bearing a plurality of pendant carboxyl containing coreactive groups and hydroxy coreactive groups. This composition does not exhibit any evidence of gelling after an additional one-week aging period at ambient temperatures. This is surprising in that an identical composition except containing no t-butyl glycidyl ether gels within a one-day period at ambient temperatures. Moreover, when the curable composition is cast on a glass plate at a wet thickness of 0.025 mm and then heated for 10 minutes at 150° C., the resulting cured film is a hard, solvent-resistant film.

What is claimed is:
1. A curable polymeric composition comprising a catalytic reactive polymeric component bearing at least one catalytic, anionic group of a strongly acidic group having a $pK_a$ of less than about 3 and a plurality of a pendant carboxyl containing coreactive group selected from the group consisting of —COOH, —COOR wherein R is a hydrocarbyl or inertly substituted hydrocarbyl or —COX wherein X is —Cl or —Br, said composition having dispersed therein a coreactive component which contains a number of latent coreactive groups sufficiently inert to the carboxyl containing coreactive group such that the composition is stable at ambient temperatures, which latent groups are converted to groups coreactive with the carboxyl containing coreactive groups in the presence of an amount of catalytic, anionic groups and at elevated temperatures sufficient to cure the composition.

2. The curable composition of claim 1 wherein the coreactive component is the monohydroxide of a hydrocarbyl ether or the monoepoxide of a hydrocarbyl ether.

3. The curable composition of claim 2 wherein the catalytic reactive polymeric component is the copolymerization product of a catalytic monomer of an addition polymerizable ethylenically unsaturated monomer bearing a sulfo group and an addition polymerizable ethylenically unsaturated reactive monomer bearing a carboxyl containing coreactive group.

4. The curable composition of claim 3 wherein the catalytic monomer is a sulfo ester of an $\alpha,\beta$-ethylenically unsaturated carboxylic acid; a monovinylidene aromatic sulfonic acid; an N-sulfonic acid derivative of an $\alpha,\beta$-ethylenically unsaturated amide or their salts and the reactive monomer is an $\alpha,\beta$-ethylenically unsaturated carboxylic acid, an alkyl ester of an $\alpha,\beta$-ethylenically unsaturated carboxylic acid or a chloride of an $\alpha,\beta$-ethylenically unsaturated carboxylic acid.

5. The curable composition of claim 4 wherein the reactive monomer is an alkyl ester of an $\alpha,\beta$-ethylenically unsaturated acid or acrylic acid and the catalytic monomer is the sulfo ester of an $\alpha,\beta$-ethylenically unsaturated carboxylic acid.

6. The curable composition of claim 4 wherein the reactive monomer is ethyl acrylate, methyl acrylate, propyl acrylate, butyl acrylate or acrylic acid and the catalytic monomer is 2-sulfoethyl methacrylate.

7. The curable composition of claim 2 wherein the coreactive component is a monoepoxide of a hydrocarbyl ether and dispersed within the curable composition is a component bearing two or more hydroxy coreactive groups.

8. The curable composition of claim 1 wherein the catalytic, anionic group is —$SO_3H$, the carboxyl containing coreactive group is a carboxy, hydrocarbyloxy carbonyl or halocarbonyl group and the latent coreactive groups are —OR wherein R is an acidic activated leaving group.

9. The curable composition of claim 8 wherein the carboxyl containing coreactive group is —COOH or —COOR wherein R is an alkyl group and the latent coreactive group is —OR wherein R is tert-butyl.

10. The curable composition of claim 8 wherein the coreactive component is represented by the formula:

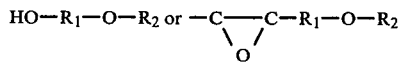

wherein $R_1$ is a divalent hydrocarbon radical and $R_2$ is an acid activated leaving group.

11. The curable composition of claim 10 wherein the coreactive component is t-butyl glycidyl ether, ethylene glycol mono-t-butyl ether or ethylene glycol mono-isobutyl ether.

* * * * *